(12) United States Patent
Rogers

(10) Patent No.: US 6,493,953 B1
(45) Date of Patent: Dec. 17, 2002

(54) MARINE COMPASS AND PACKAGE

(76) Inventor: Thomas W. Rogers, 6103 Crown Cir., Franklin, TN (US) 37067

( * ) Notice: Subject to any disclaimer, the term of this patent is extended or adjusted under 35 U.S.C. 154(b) by 120 days.

(21) Appl. No.: 09/672,765

(22) Filed: Sep. 29, 2000

Related U.S. Application Data

(60) Provisional application No. 60/161,010, filed on Oct. 25, 1999.

(51) Int. Cl.[7] .............................................. G01C 17/08
(52) U.S. Cl. ...................................... 33/355 R; 33/364
(58) Field of Search ........................ 33/316, 319, 324, 33/333, 347, 355 R, 364

(56) References Cited

U.S. PATENT DOCUMENTS

| | | | | |
|---|---|---|---|---|
| 1,987,383 A | * | 1/1935 | White | 33/364 |
| 2,428,346 A | * | 9/1947 | White | 33/364 |
| 2,493,043 A | * | 1/1950 | Stipsky | 33/355 R |
| 2,638,683 A | * | 5/1953 | Reece et al. | 33/355 R |
| 2,903,798 A | * | 9/1959 | Taylor | 33/364 |
| 2,941,307 A | * | 6/1960 | Frisbie | 33/364 |
| 3,128,562 A | * | 4/1964 | Yusa | 33/364 |
| 3,473,234 A | * | 10/1969 | Kjellstrom et al. | 33/364 |
| 3,481,045 A | * | 12/1969 | White | 33/364 |
| 3,585,728 A | * | 6/1971 | Ogg | 33/364 |
| 3,949,483 A | * | 4/1976 | White | 33/355 R |
| 4,250,627 A | * | 2/1981 | Järvenpää et al. | 33/364 |
| 4,303,172 A | * | 12/1981 | Bosland | 33/364 |
| 4,359,823 A | * | 11/1982 | White | 33/364 |
| 4,453,317 A | * | 6/1984 | Rahn | 33/364 |
| 4,930,224 A | * | 6/1990 | LeBlanc | 33/355 D |

* cited by examiner

Primary Examiner—G. Bradley Bennett
(74) Attorney, Agent, or Firm—Charles M. Kaplan

(57) ABSTRACT

A marine compass module can be selectively mounted in either a U-shaped bracket or a binnacle, and all of these items can be marketed in the same package. The compass module can be adjusted so that its magnetic card is horizontally aligned even though the compass is mounted on a non-horizontal surface of a marine vessel. The magnetic adjusting rods are contained in the compass module itself instead of being in the mounting hardware.

14 Claims, 6 Drawing Sheets

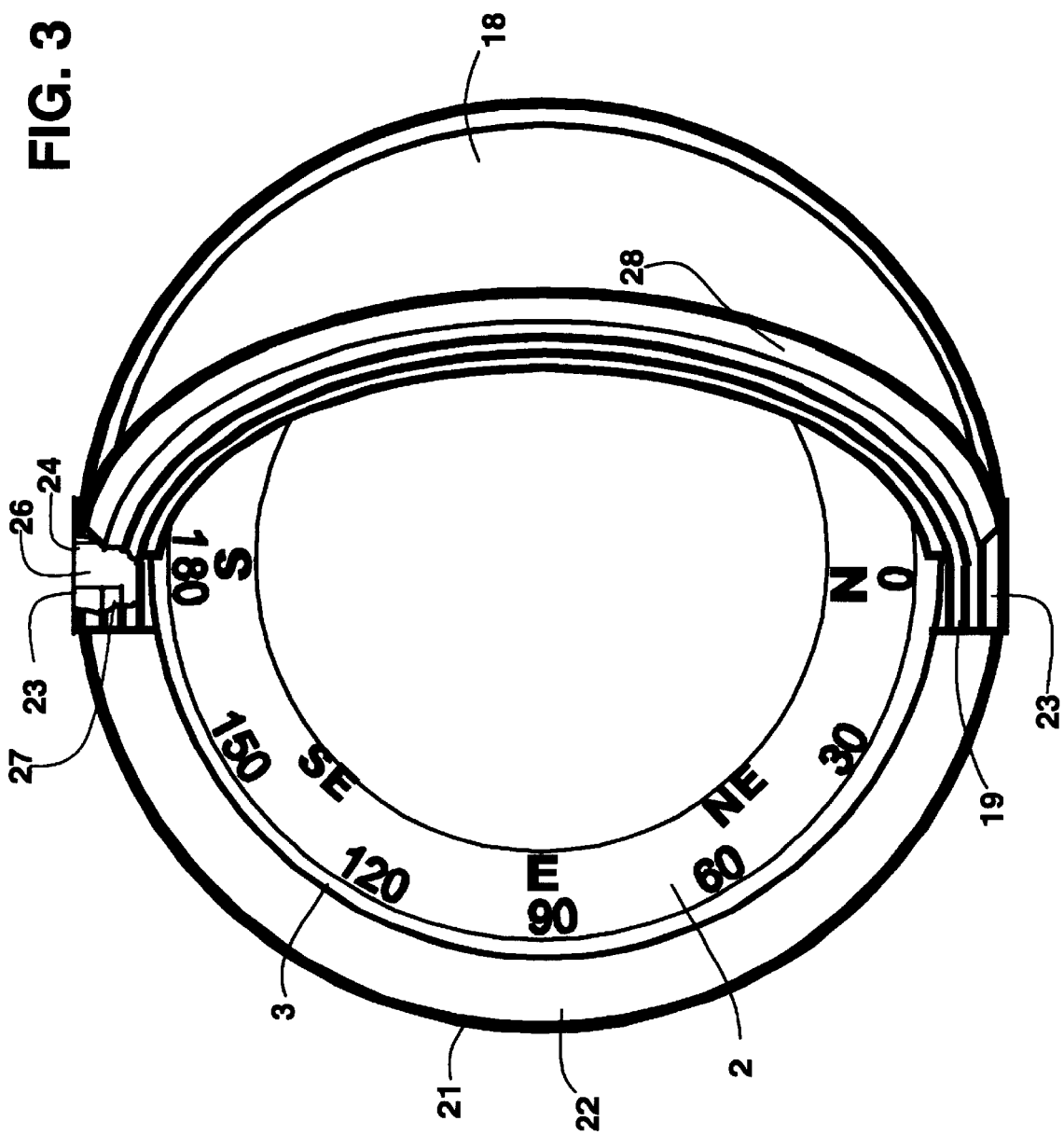

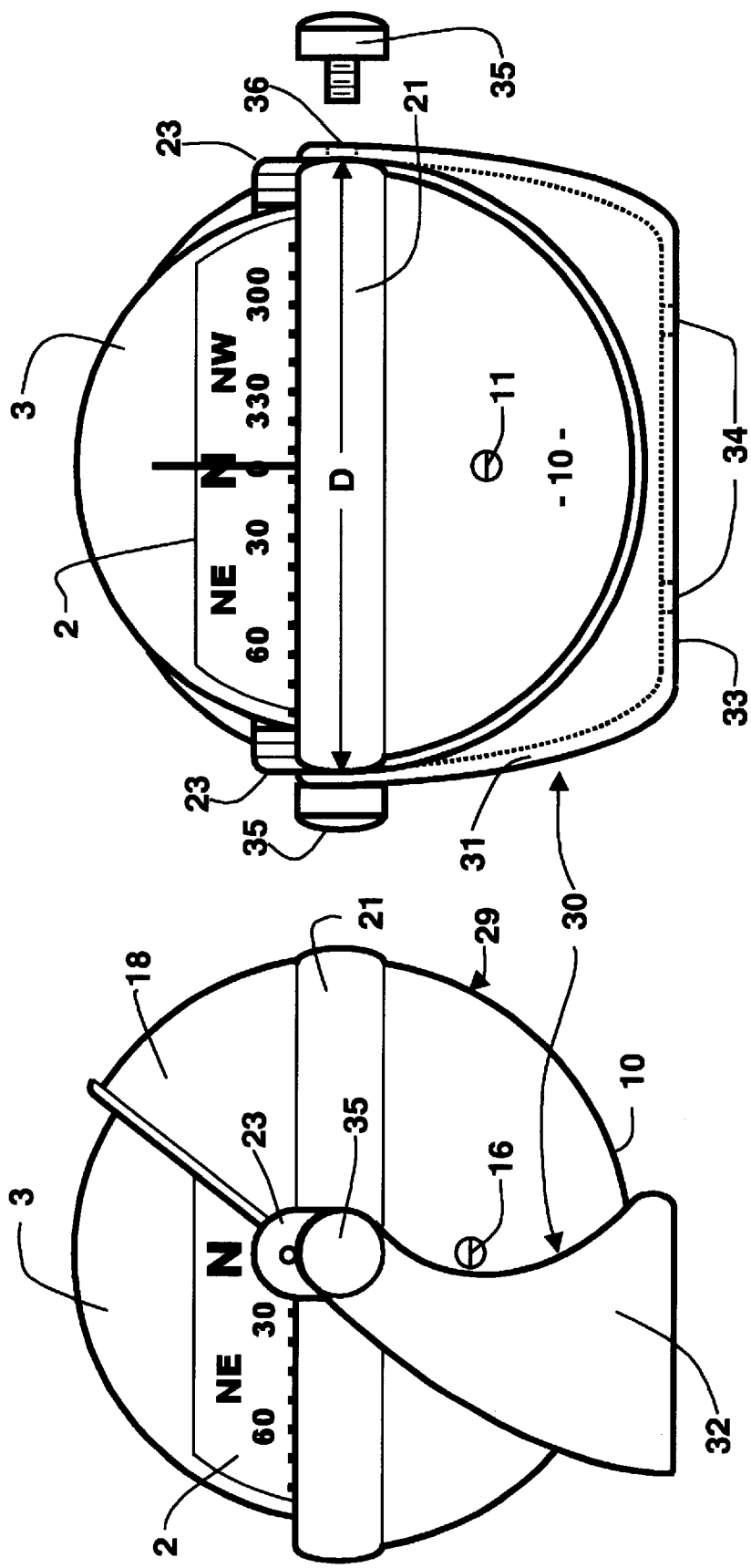

MARINE COMPASS AND PACKAGE

This application is entitled to the date of U.S. Provisional Patent Application Serial No. 60/161,010, which was filed on Oct. 25, 1999.

BACKGROUND OF THE INVENTION

This invention relates to navigation instruments, and more particularly to mounting supports and packaging for marine compasses.

Marine compasses are commonly mounted on either a simple U-shaped bracket or on a binnacle. A gimbal, which usually includes a pair of rings moving on pivots, must be included if a prior art compass is being attached to a surface of a vessel that is not horizontal, and binnacle supported compasses have contained the magnetic adjusting rods inside of the binnacle support shell. This has made it impossible for a prior art compass to be selectively mounted on either a U-shaped bracket or on a binnacle. This lack of mounting selectivity has increased the cost and the complexity of the packaging of marine compasses, and has prevented the consumer from switching from one type of mount to another for any given compass.

OBJECTIVES OF THE INVENTION

Accordingly, it is an object of this invention to provide an improved marine compass and improved packaging for such instruments.

Another object is to provide a marine compass that can be mounted in either a binnacle or a U-shaped bracket.

Another object is to provide a marine compass that does not have a gimbal but can be adjusted to a fixed horizontal position along a fore-aft axis.

An additional object is to provide a marine compass that can be changed from one type of mounting support to a different type of mounting support.

Another object is to provide an adjustable binnacle mounted marine compass in which the magnetic adjustment screws are located in the compass module instead of in the binnacle.

A further object is to provide an adjustable, changeably mounted marine compass that is rugged, economical, pleasing in appearance, easy to install, and which does not possess defects found in similar prior art.

Another object is to provide packaging for a marine compass that includes a binnacle and a U-shaped bracket for selectively mounting the compass.

Other objects and advantages of the marine compass and package incorporating this invention will be found in the specification and claims and the scope of the invention will be set forth in the claims.

DESCRIPTION OF THE DRAWING

FIG. 3 is an enlarged, partially broken away top plan view of the compass module in FIG. 1.

FIG. 4 is a front view showing the compass module mounted in a U-shaped bracket.

FIG. 5 is a side view showing the compass module mounted in a U-shaped bracket.

DESCRIPTION OF THE INVENTION

Figure 1:
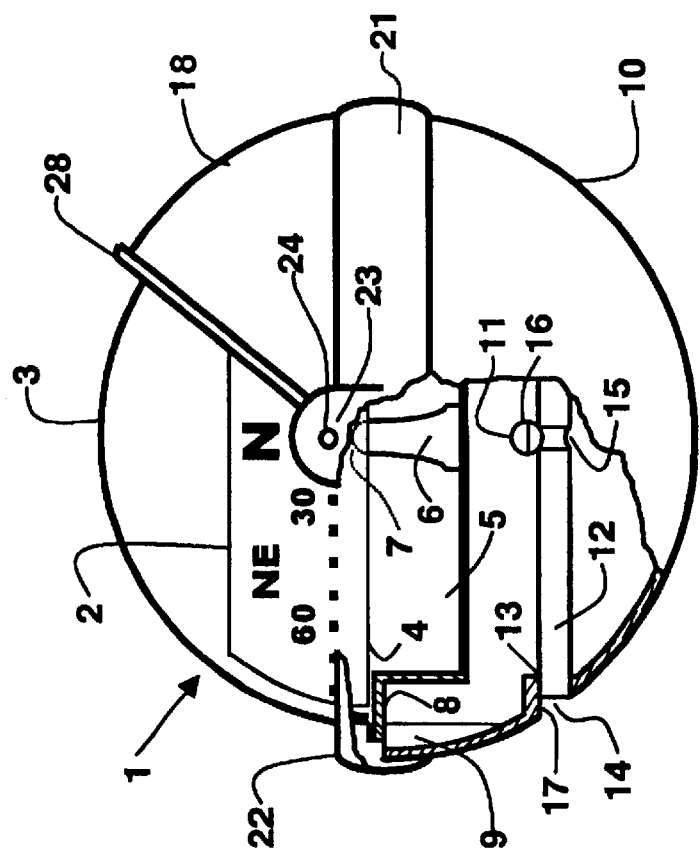
FIG. 1 is a partially broken away side view of a compass module of a marine compass in accord with this invention showing its hood closed.

The drawing shows marine compass mounting arrangements and packaging in accord with this invention. The compass module 1 includes an imprinted magnetic card 2 floating in conventional manner in a viscous fluid, such as mineral oil or Isopar. The card 2 is contained in a sealed transparent hemispherical plastic housing 3, and card 2 has a bottom end 4 that floats above a shallow well 5 in the bottom of the housing. Card 2 is balanced on an upwardly projecting pivot post 6 in well 5 that fits into an indentation 7 in the bottom of the card. An outwardly extending peripheral shelf 8 around housing 3 supports the housing by being welded to four ledges 9 spaced uniformly around the interior of a hemispherical plastic cradle 10 at the cradle's upper edge. The cradle 10 holds a pair of perpendicularly oriented magnetic compensation rods 11 and 12 below the well 5. The ends 14 of the rods 11 and 12 are rotatably journalled in circular holes 13 in the cradle 10, and each rod has a groove 15 that mates with a like groove in the other rod. One slotted end 16 of each of the rods 11 and 12 is accessible through a hole 17 through the outer wall of the cradle.

Figure 2:
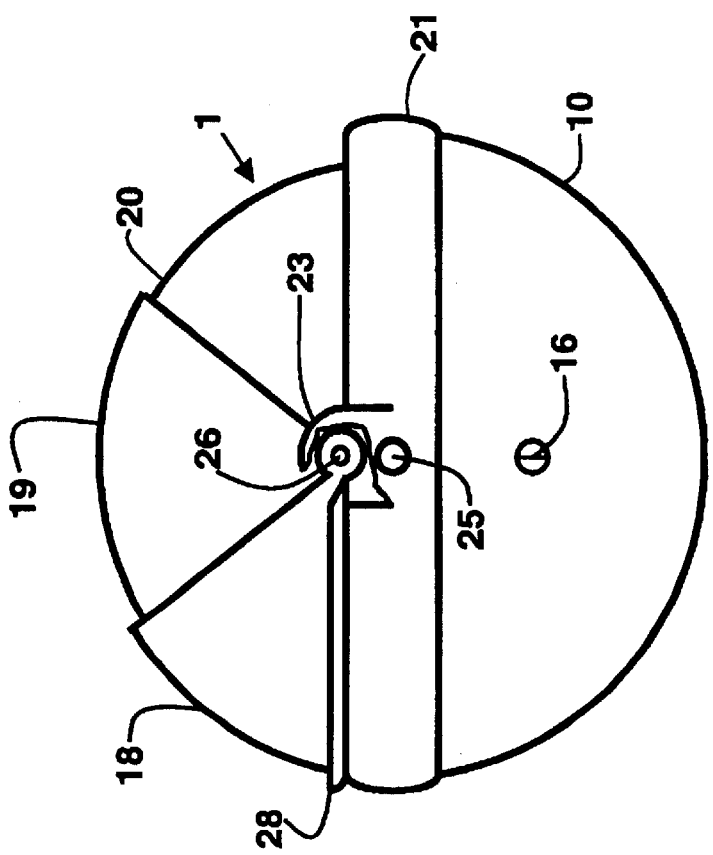
FIG. 2 is a partially broken away side view of the FIG. 1 compass module showing its hood open.

Compass module 1 has a protective collapsible hood having three telescoping segments 18, 19 and 20 that are shown in closed position in FIG. 1 and in open position in FIGS. 2 and 3. The hood segments are supported by a circular ring 21 that is secured to the cradle 10 adjacent its upper edge by solvent or ultrasonic welding. The ring 21 has an inwardly projecting rim 22 that closes the space between the housing 3 and the ring. Ring 21 also has a pair of diametrically opposed upstanding ears 23, each of which has a bearing hole 24 and a threaded hole 25. Hood segment 19 has a pair of diametrically opposed, outwardly projecting axles 26. Hood segment 18 has a pair of bearing holes 27. The axles 26 pass through the holes 24 in the ears 23 and the holes 27 in the hood segment 18 so that the hood segments 18 and 19 can pivot back and forth between the closed position shown in FIG. 1 and the open position shown in FIG. 2. The hood segment 20 is immovably attached to the rig 21. The outer hood segment 18 has a peripheral support ridge 28. The housing 3, cradle 10 and ring 21 define a generally spherical outer shell 29 having a predetermined outer diameter D. The threaded holes 25 are aligned at the opposite outer ends of the diameter D.

As shown in FIGS. 4 and 5, the compass module 1 may be selectively supported by a U-shaped bracket 30 having a pair of upstanding arms 31 and 32 connected by a foot 33. Screws or other fasteners (not shown) may pass through holes 34 in foot 33 for attaching the bracket to a support surface on a marine vessel. The compass module is removably attached to bracket 30 by threaded thumb screws 35 that pass through holes 36 in the arms 31 and 32 that are dimensioned to enable the screws to pass there through. The screws 35 then are threaded into the threaded holes 25 in the ears 23. If the foot 33 is attached to a surface such as 47 that slants with respect to the horizontal fore-aft axis, the thumb screws 35 can be loosened, the compass module 1 can then be pivoted until the card 2 is horizontal, and the thumb screws re tightened to hold the module 1 in the horizontal position. The magnetic compensation screw 11 may be adjusted by rotating the compass module 1 within the bracket 30 until the screw 11 moved to where it is past the arm 32, as shown in FIG. 5.

Figure 6:
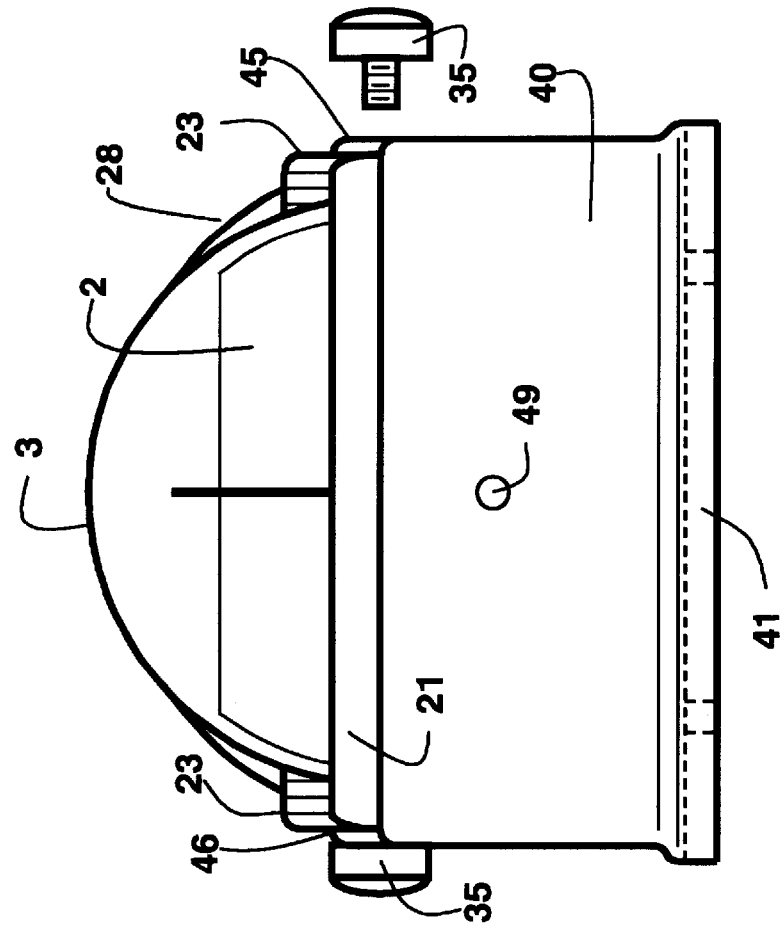
FIG. 6 is a partially broken away side view showing the compass module mounted in a binnacle.
Figure 7:
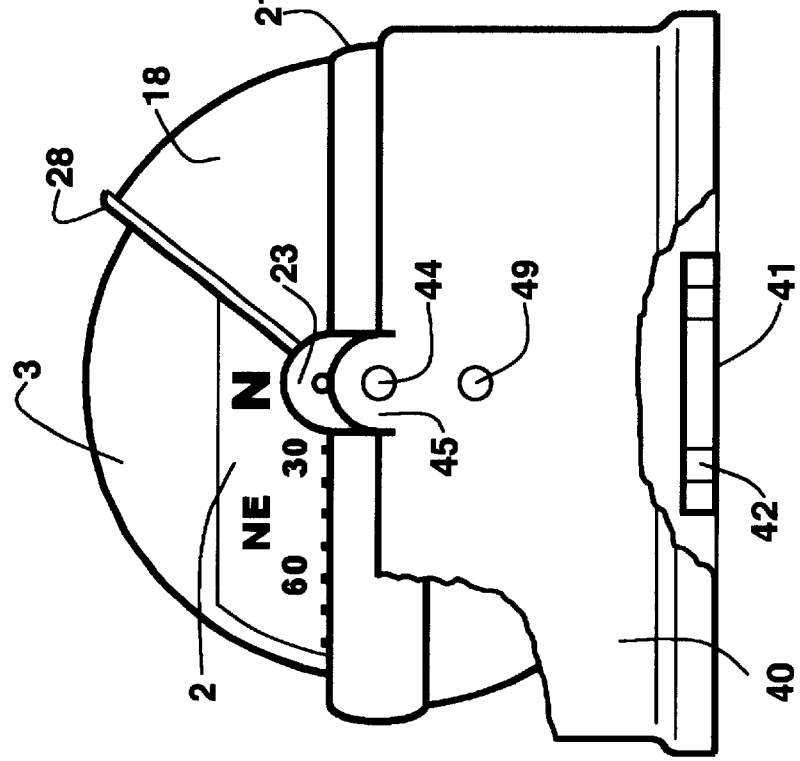
FIG. 7 is a front view showing the compass module mounted in a binnacle.
Figure 8:
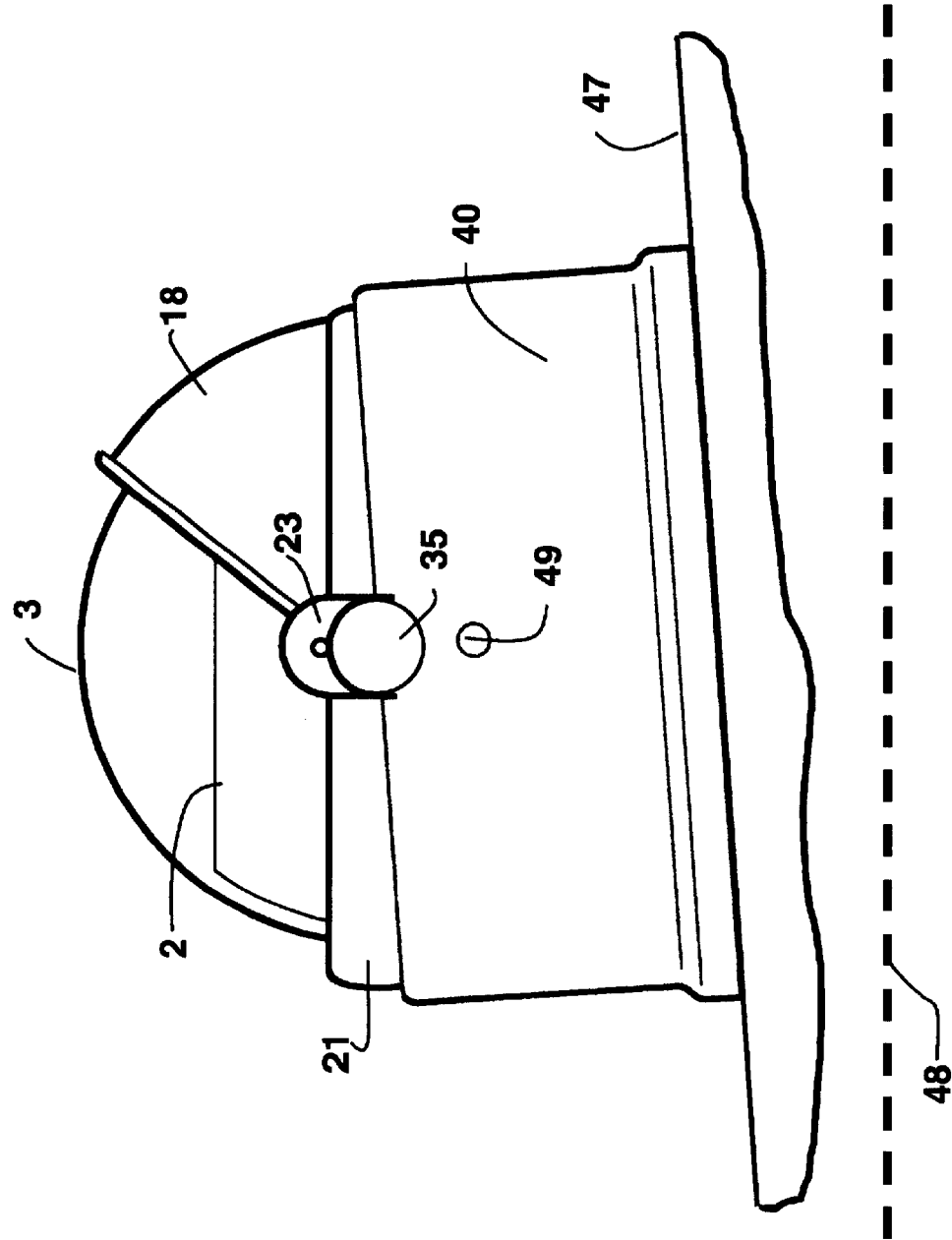
FIG. 8 is a side view showing the binnacle mounted compass of FIG. 6 supported on a slanting surface.
Figure 10:
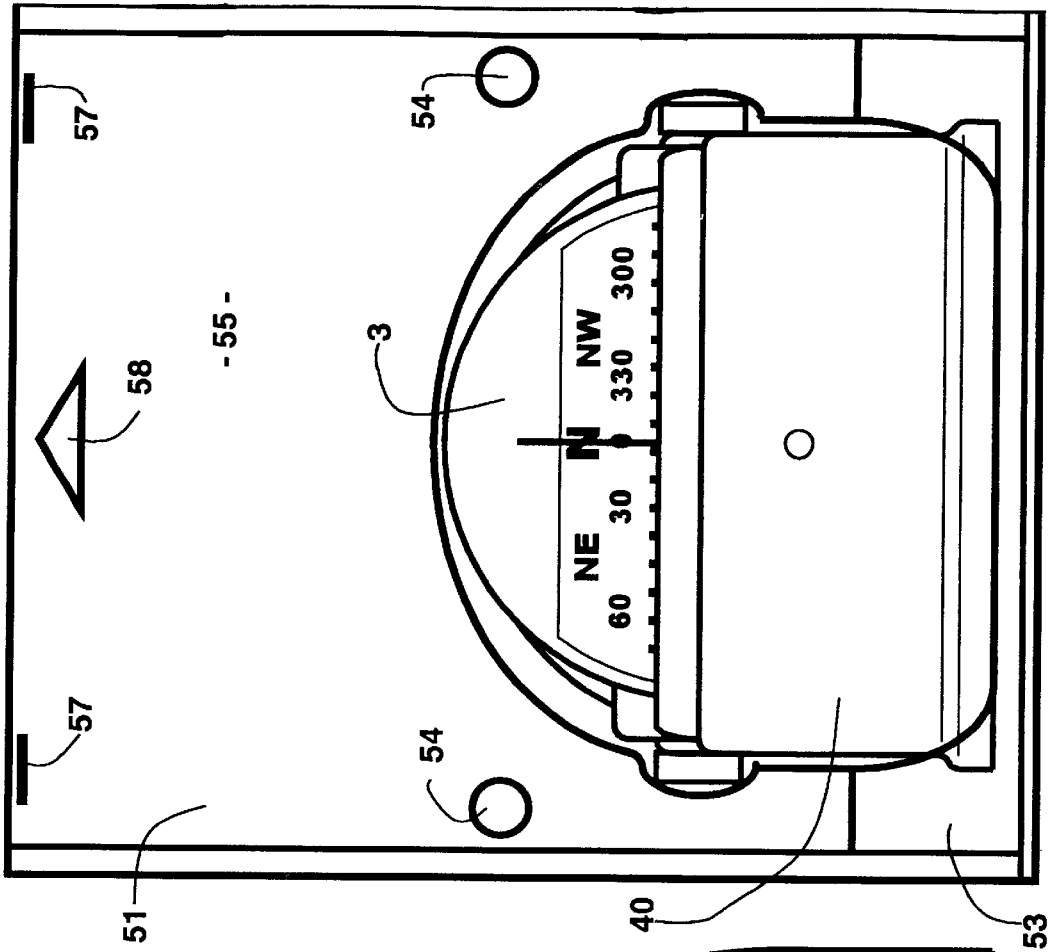
FIG. 10 is a rear view of the package shown in FIG. 9.
Figure 9:
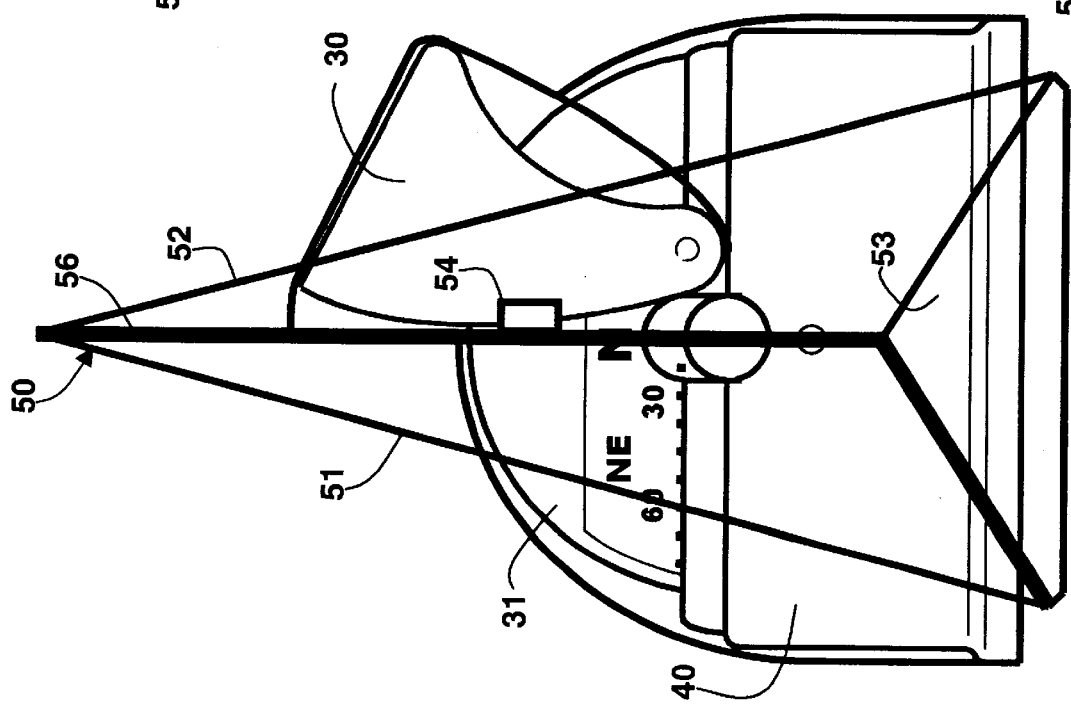
FIG. 9 is a side view of a package containing the compass and mounting supports of this invention.

As shown in FIGS. 6–8, the compass module 1 may also be selectively supported in an essentially open ended cylindrical plastic binnacle 40, having a cross piece 41 at its bottom end with holes 42 for fasteners to attach the binnacle to a support surface on a vessel. The compass module 1 is removably attached to binnacle 40 by threaded thumb screws 43 (identical to the screws 35) that pass through holes 44 in lobes 45 and 46 at the top of the binnacle that are dimensioned to enable the screws to pass there through. The thumb screws 43 are then threaded into the threaded holes 25 in the ears 23 of the compass module. If the cross piece 41 is attached to a surface 47 that slants with respect to the vessel's horizontal fore-aft axis 48 (see FIG. 8), the thumb screws 43 can be loosened, and the compass module 1 can then be pivoted until the card 2 is horizontal, and the thumb screws re-tightened to hold the module 1 in the horizontally aligned position. The magnetic compensation rods 11 and 12 may be adjusted by inserting a screw driver through holes 49 that pass through the side wall of the binnacle providing access to the slotted ends 16.

The compass module 1, U-shaped mounting bracket 30 and binnacle 40 can all be marketed in single one piece package 50, which has a front transparent plastic clam shell 51, a back transparent plastic clam shell 52 and a connecting bottom panel 53. Press fit buttons 54 hold the shells 51 and 52 together in conventional manner. An information containing display card 55 may be inserted along the line 56 at which the clam shells 51 and 52 meet. The clam shells are shaped to closely outline the shapes of the compass module 1, U-shaped bracket 30 and binnacle 40, and the module 1 is secured in the binnacle as described above with reference to FIGS. 6 and 7. Staples 57 may be used to secure the top of the package 50, and a hole 58 may be provided to aid in hanging the package on a merchandising display rack.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. The combination comprising an ungimbaled marine compass that is adjustable to a fixed horizontal position with respect to a surface of a marine vessel upon which said compass is mountable, a generally U-shaped mounting bracket, and a binnacle, said compass being selectively supportable for mounting on such surface of a marine vessel in either said U-shaped bracket or said binnacle;

said compass comprising a generally circular outer shell having a predetermined outer diameter, a magnetic card supported in said shell, there being a pair of diametrically opposed threaded holes in said shell located at opposite ends of said outer diameter;

said U-shaped bracket comprising a pair of upstanding arms connected by a foot that is adapted to be attached to such surface of a marine vessel upon which said compass is mountable, said foot having a length essentially equal to said outer diameter of said shell so that said upstanding arms are separated by a distance essentially equal to said outer diameter of said shell, and there being a pair of aligned holes in said upstanding arms;

said binnacle being essentially cylindrical and having an internal diameter essentially equal to said outer diameter of said shell, said binnacle having an open upper end and a cross piece at its bottom end that is adapted to be attached to such surface of a marine vessel upon which said compass is mountable, and there being a pair of diametrically aligned holes in said binnacle;

a pair of screws threaded to mate with said threaded holes in said shell, said pair of aligned holes in said U-shaped bracket and said pair of diametrically aligned holes in said binnacle being dimensioned to enable said screws to pass there through;

said shell being selectively supportable in said U-shaped bracket by aligning each of said threaded holes with one of the holes of said pair of aligned holes in said upstanding arms and passing said screws through said aligned holes and threading said screws into said threaded holes in said shell, and said shell also being selectively supportable in said binnacle by aligning said each of said threaded holes with one of the holes of said pair of diametrically aligned holes in said binnacle and passing said screws through said diametrically aligned holes and threading said screws into said threaded holes in said shell; and said compass being adjustable to a fixed horizontal position with respect to such surface of a marine vessel upon which said compass is mountable by loosening said screws and pivoting said shell selectively in said U-shaped bracket or in said binnacle until said card is horizontally aligned with respect to such surface of a marine vessel and then re-tightening said screws.

2. The combination defined in claim 1 further comprising said outer shell comprising a viscous fluid contained in a sealed transparent hemispherical plastic housing, said card floating in said fluid with its bottom end floating above a shallow well in the bottom of the housing, said card being balanced on an upwardly projecting pivot post that fits into an indentation in the bottom of the card, said outer shell further comprising an open ended generally circular plastic cradle for supporting said housing, said housing having an outwardly extending peripheral shelf supported in said cradle, and said shallow well projecting into said cradle below said shelf.

3. The combination defined in claim 2 further comprising said cradle having a plurality of uniformly spaced ledges around its interior at its upper edge and said shelf being supported on said ledges.

4. The combination defined in claim 2 further comprising a pair of perpendicularly oriented magnetic compensation rods rotatably journalled in circular holes in said cradle below said well.

5. The combination defined in claim 2 further comprising said cradle being generally spherical and having a circular ring surrounding and secured to said cradle at its upper end.

6. An ungimbaled marine compass that is adjustable to a fixed horizontal position with respect to a surface of a marine vessel upon which said compass is mountable, comprising a card floating in a viscous fluid contained in a sealed transparent hemispherical plastic housing, said card having a bottom end that floats above a shallow well in the bottom of the housing, said card being balanced on an upwardly projecting pivot post that fits into an indentation in the bottom of said card, an open ended generally hemispherical liquid-free plastic cradle for supporting said housing, a circular ring surrounding said cradle and secured to its upper end, said housing having an outwardly extending peripheral shelf supported by said cradle, said shallow well projecting into said cradle below said shelf, said outer ring having a predetermined outer diameter and there being a pair of threaded holes in said ring at ends of said outer diameter, and a pair of screws threaded to mate with said threaded holes in said outer ring for adjusting said compass to a fixed horizontal position with respect to said surface of said marine vessel.

7. The marine compass defined in claim 6 further comprising a U-shaped bracket comprising a pair of upstanding arms connected by a foot that is adapted to be attached to a surface of a marine vessel upon which said compass is mountable, said foot having a length essentially equal to said outer diameter of said ring so that said upstanding arms are separated by a distance essentially equal too said outer diameter of said ring, there being a pair of aligned holes in said upstanding arms; said pair of aligned holes in said U-shaped bracket being dimensioned to enable said screws to pass there through; said housing being supported in said U-shaped bracket by aligning each of said threaded holes with one of the holes of said pair of aligned holes in said upstanding arms and passing said screws through said aligned holes and threading said screws into said threaded holes in said ring; and said compass being adjustable with respect to such surface of a marine vessel upon which said compass is mountable by loosening said screws and pivoting said cradle in said U-shaped bracket until said card is horizontally aligned with respect to such surface of a marine vessel upon which said compass is mountable and then re-tightening said screws.

8. The marine compass defined in claim 6 further comprising an essentially cylindrical binnacle having an internal diameter essentially equal to said outer diameter of said ring, said binnacle having an open upper end and a cross piece at its bottom end that is adapted to be attached to a surface of a marine vessel upon which said compass is mountable, and there being a pair of diametrically aligned holes in said binnacle; said pair of aligned holes in said binnacle being dimensioned to enable said screws to pass there through; said housing being supported in said binnacle by aligning each of said threaded holes with one of the holes of said pair of diametrically aligned holes in said binnacle and passing said screws through said diametrically aligned holes and threading said screws into said threaded holes in said ring; and said compass being adjustable with respect to said surface of a marine vessel upon which said compass is supported by loosening said screws and pivoting said cradle in said binnacle until said card is horizontally aligned with respect to such surface of a marine vessel upon which said compass is mountable and then re-tightening said screws.

9. The marine compass defined in claim 6 further comprising said cradle having a plurality of uniformly spaced ledges around its interior at its upper edge, and said shelf of said housing being supported on said ledges.

10. The marine compass defined in claim 6 further comprising a pair of perpendicularly oriented magnetic compensation rods rotatably journalled in circular holes in said cradle below said well.

11. The marine compass defined in claim 6 further comprising said compass being selectively supportable for mounting on a surface of a marine vessel in either a U-shaped bracket or a binnacle;

said U-shaped bracket comprising a pair of upstanding arms connected by a foot that is adapted to be attached to such surface of a marine vessel upon which said compass is mountable, said foot having a length essentially equal to said outer diameter of said ring so that said upstanding arms are separated by a distance essentially equal too said outer diameter of said ring, there being a pair of aligned holes in said upstanding arms;

said binnacle being essentially cylindrical and having an internal diameter essentially equal to said outer diameter of said ring, said binnacle having an open upper end and a cross piece at its bottom end that is adapted to be attached to such surface of a marine vessel upon which said compass is mountable, and there being a pair of diametrically aligned holes in said binnacle;

said pairs of aligned holes in said U-shaped bracket and said binnacle being dimensioned to enable said screws to pass there through;

said shell being selectively supportable in said U-shaped bracket by aligning each of said threaded holes with one of the holes of said pair of aligned holes in said upstanding arms and passing said screws through said aligned holes and threading said screws into said threaded holes in said ring, and said shell also being selectively supportable in said binnacle by aligning said each of said threaded holes with one of the holes of said pair of diametrically aligned holes in said binnacle and passing said through said diametrically aligned holes and threading said screws into said threaded holes in said ring; and said compass being adjustable with respect to such surface of a marine vessel upon which said compass is mountable by loosening said screws and pivoting said shell selectively in said U-shaped bracket or said binnacle until said card is horizontally aligned with respect to such surface of a marine vessel upon which said compass is mountable and then re-tightening said screws.

12. A packaged marine compass comprising a compass module, a U-shaped mounting bracket and binnacle enclosed between a front transparent plastic clam shell and a back transparent plastic clam shell that are connected by a bottom panel; and an information containing display card inserted between said clam shells along a line at which said clam shells meet.

13. The packaged marine compass defined in claim 12 further comprising said compass being ungimbaled and being adjustable and selectively supportable for mounting in a fixed horizontal position on a surface of a marine vessel in either said U-shaped bracket or said binnacle;

said compass comprising a generally circular outer shell having a predetermined outer diameter, a magnetic card supported in said shell, there being a pair of diametrically opposed threaded holes in said shell located at opposite ends of said outer diameter;

said U-shaped bracket comprising a pair of upstanding arms connected by a foot that is adapted to be attached to such surface of a marine vessel upon which said compass is mountable, said foot having a length essentially equal to said outer diameter of said shell so that said upstanding arms are separated by a distance essentially equal to said outer diameter of said shell, and there being a pair of aligned holes in said upstanding arms;

said binnacle being essentially cylindrical and having an internal diameter essentially equal to said outer diameter of said shell, said binnacle having an open upper end and a cross piece at its bottom end that is adapted to be attached to such surface of a marine vessel upon which said compass is mountable, and there being a pair of diametrically aligned holes in said binnacle;

a pair of screws threaded to mate with said threaded holes in said shell, said pair of aligned holes in said U-shaped bracket and said pair of diametrically aligned holes in said binnacle being dimensioned to enable said screws to pass there through;

said shell being selectively supportable in said U-shaped bracket by aligning each of said threaded holes with one of the holes of said pair of aligned holes in said upstanding arms and passing said screws through said aligned holes and threading said screws into said threaded holes in said shell, and said shell also being selectively supportable in said binnacle by aligning said each of said threaded holes with one of the holes of said pair of diametrically aligned holes in said binnacle and passing said screws through said diametrically aligned holes and threading said screws into said threaded holes in said ring; and said compass being adjustable with respect to such surface of a marine vessel upon which said compass is mountable by loosening said screws and pivoting said shell selectively in said U-shaped bracket or in said binnacle until said card is horizontally aligned with respect to such surface of a marine vessel upon which said compass is mountable and then re-tightening said screws so as to fix said compass in said horizontally aligned position.

14. The packaged marine compass defined in claim 12 further comprising said compass comprising a magnetic card floating in a viscous fluid contained in a sealed transparent hemispherical plastic housing, said card having a bottom end that floats above a shallow well in the bottom of the housing, said card being balanced on an upwardly projecting pivot post that fits into an indentation in the bottom of the card, an open ended generally circular plastic cradle for supporting said housing, said housing having an outwardly extending peripheral shelf supported by said cradle, and said shallow well projecting into said cradle below said shelf.

* * * * *